United States Patent [19]

Dunn

[11] 4,432,227

[45] * Feb. 21, 1984

[54] VALVE TESTING APPARATUS

[76] Inventor: Emmett L. Dunn, 103 Lazy Springs (April Sound), Montgomery, Tex. 77356

[*] Notice: The portion of the term of this patent subsequent to Jan. 19, 1999 has been disclaimed.

[21] Appl. No.: 308,462

[22] Filed: Oct. 5, 1981

Related U.S. Application Data

[63] Continuation of Ser. No. 146,172, May 2, 1980, Pat. No. 4,311,038, and a continuation-in-part of Ser. No. 19,813, Mar. 12, 1979, abandoned.

[51] Int. Cl.³ .............................................. G01M 3/04
[52] U.S. Cl. .......................................... 73/49.8; 73/46
[58] Field of Search ................... 73/49.8, 46, 40, 49.7; 74/519, 520

[56] References Cited

U.S. PATENT DOCUMENTS

| | | | |
|---|---|---|---|
| 971,191 | 9/1910 | Gray | 73/49.8 |
| 1,373,824 | 4/1921 | McKenzie | 73/46 X |
| 3,088,312 | 5/1963 | Morris | 73/46 |
| 3,163,035 | 12/1964 | Kinzie et al. | 73/49.8 |
| 4,311,038 | 1/1982 | Dunn | 73/49.8 |

Primary Examiner—S. Clement Swisher
Assistant Examiner—Joseph W. Roskos
Attorney, Agent, or Firm—Michael P. Breston

[57] ABSTRACT

The valve testing apparatus is adapted for testing a flanged device having a casing defining a chamber and at least one annular end flange disposed on a horizontal test plate having a fluid inlet. At least one clamping unit is provided which comprises a lever disposed in a radial direction relative to the center of the annular flange. The lever has an outer end detachably resting on an underlying support, and an inner end gripping a portion of the flange. A fulcrum is fixedly mounted above the lever intermediate its inner and outer ends. The lever is adapted to pivot about the fulcrum. A hydraulic ram exerts a vertical force against one end of the lever, thereby causing the inner end of the lever to exert a predetermined clamping pressure on the flange, so as to obtain a fluid-tight connection between the flange and the plate.

7 Claims, 7 Drawing Figures

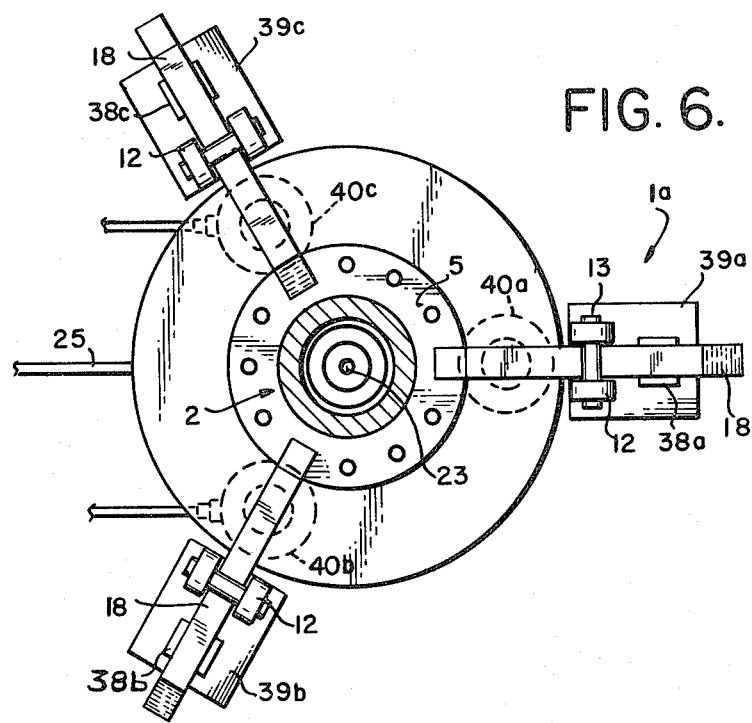
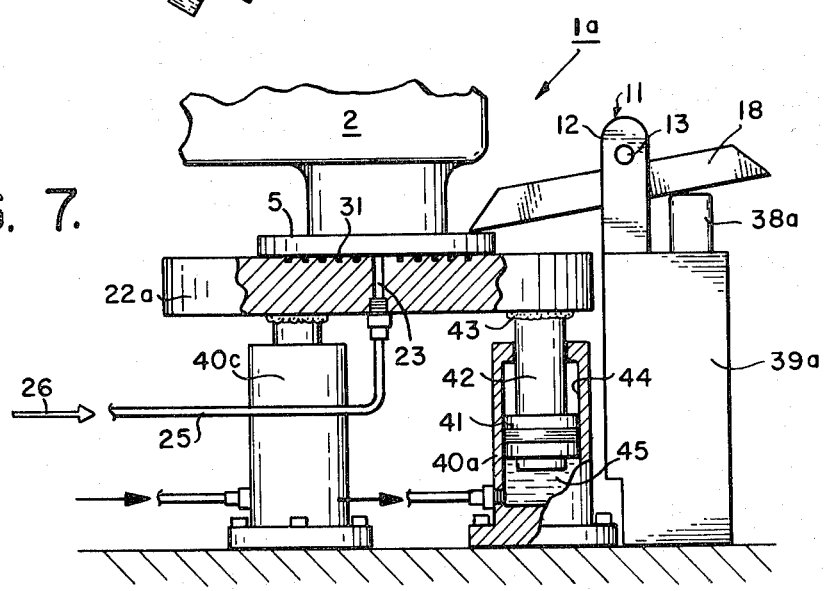

4,432,227

VALVE TESTING APPARATUS

REFERENCE TO RELATED APPLICATIONS

This application is a continuation-in-part of my application, Ser. No. 019,813, filed on Mar. 12, 1979 and now abandoned, and a continuation of my application Ser. No. 146,172, filed on May 2, 1980 and now U.S. Pat. No. 4,311,038.

BACKGROUND OF THE INVENTION (a) Field of the Invention

This invention relates to valve testing fixtures for testing valves.

(b) Description of the Prior Art

Various industries use different types and sizes of fluid devices, such as valves, which periodically require to be tested to determine their strength, accuracy of workmanship, fluid tightness, as well as their stability for a particular purpose. In order to test such valves, various machines having clamping fixtures have been proposed and used. Such fixtures are described, for example, in U.S. Pat. Nos. 971,191, 3,163,035 and 3,088,312.

The clamping fixtures of the known valve testing machines have different drawbacks, the most important of which are: their parts have an arrangement which is complicated and time-consuming to operate, the parts lose their operative effectiveness in a relatively short time, requiring frequent maintenance and repair; such machines are also limited to a narrow range of valve sizes; and the known machines sometimes act on the entire casting of the test valve and, therefore, frequently damage the valve's structural integrity, and at the same time they obstruct visual inspection of the valve's inside, while the test is in progress.

SUMMARY OF THE INVENTION

The testing apparatus is adapted for testing a flanged device having a casing defining a chamber and at least one annular end flange adapted to be disposed on a horizontal test plate having a fluid inlet. A sealing element is disposed on the plate underneath the flange. The fluid inlet is in fluid communication with the valve's chamber. At least one clamping unit is provided which comprises a lever disposed in a radial direction relative to the center of the annular flange. The lever has an outer end detachably resting on an underlying support, and an inner end gripping a portion of the flange. A fulcrum is fixedly mounted above the lever intermediate its inner and outer ends. The lever is adapted to pivot about the fulcrum. Controllable force-producing means exert a vertical force against one end of the lever, thereby causing the inner end of the lever to exert a predetermined clamping pressure on the flange. This clamping pressure compresses the sealing element, whereby a fluid-tight connection is established between the flange and the test plate to allow the chamber in the device to accept a high-pressure fluid through the fluid inlet in the plate for testing the flanged device.

In a preferred embodiment of the testing apparatus, the force-producing means is a fluid-operated ram, and the outer end of the lever detachably rests on and is supported by the ram, whereby the upward vertical movement of the ram produces the desired predetermined clamping pressure.

In an alternate embodiment of the testing apparatus, the force-producing means is also a fluid-operated ram, and the test plate rests on and is supported by the ram for movement in a vertical direction. The outer end of the lever detachably rests on and is supported by a fixed, immovable support, whereby the upward vertical movement of the ram produces the desired predetermined clamping pressure.

The test plate in all embodiments preferably has at least one annular groove, and the sealing element is a seal ring mounted in the groove. In yet another modification, the flange has a mating annular groove, and the seal ring is disposed in the grooves of the plate and of the flange.

In the preferred embodiments of the testing apparatus, the plate preferably has a cylindrical depression for tightly receiving therein a cylindrical plate insert. The insert has the annular groove in which is mounted the seal ring.

BRIEF DESCRIPTION OF THE DRAWINGS

FIG. 6 is a top plan view of an alternate embodiment of the testing apparatus of the invention utilizing a plurality of hydraulic cylinders whose rams are fixedly secured to for movably supporting the test plate, and the outer ends of the levers abut against solid, immovable supports.

FIG. 7 is a side view in elevation, partly in section, of the alternate embodiment shown in FIG. 6.

DETAILED DESCRIPTION OF PREFERRED EMBODIMENTS

Figure 1:
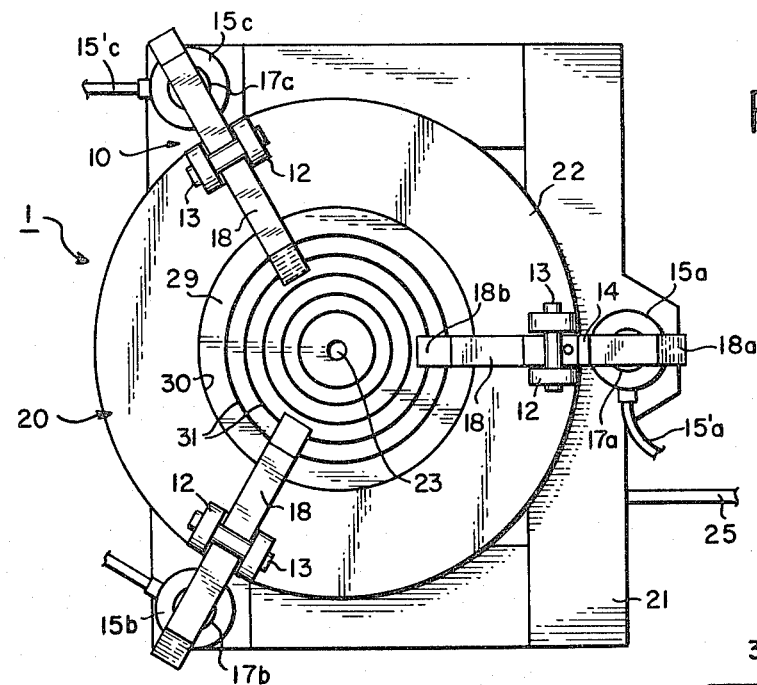
FIG. 1 is a top plan view of a preferred embodiment of the testing apparatus of the invention showing a test plate having an insert which carries a plurality of concentric O-rings, and the clamping units have a plurality of fluid-operated levers, each being pivotable about an overlying fulcrum.
Figure 3:
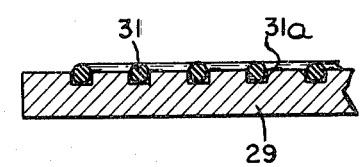
FIG. 3 is a fragmentary, sectional view of the plate insert which is detachably disposed in a cylindrical depression in the test plate.

The preferred embodiment of the testing apparatus of the invention, shown in FIGS. 1-4, is generally designated as 1. It is adapted for clamping down a fluid device, which will be illustrated as a conventional valve to be hydrostatically tested, hereinafter called a "test valve", generally designated as 2. Valve 2 has a casing 3 and a pair of end flanges 4, each having an inner side 5 and an outer side 6. Casing 3 defines a fluid chamber or bore 3a which can be sealed off by a movable closure member 7 operated by a handle or wheel 8.

A strong table 20 constructed of rigid legs and I-beams 21 is adapted for supporting a horizontal test plate 22. At least three clamping units 10 are circumferentially disposed about the periphery of plate 22. Each clamping unit 10 comprises a yoke 11 which is welded to plate 22 and which has a pair of upwardly-extending parallel plates 12 for supporting a cross bar 13. Bar 13 serves a fulcrum about which an underlying lever 18 can pivot. Lever 18 has an inner end 18b and an outer end 18a. Fulcrum 13 is disposed sufficiently above plate 22 to allow lever 18 to accommodate the maximum anticipated thickness of flange 4. For flanges 4 having a reduced thickness, an insert 14 is preferably disposed between lever 18 and bar 13, thereby reducing the maximum swing of lever 18 and, hence, the length of the stroke of the force-producing means.

Levers 18 are operated by force-producing means such as hydraulic cylinders 15a–15c having inlets 16 and rams 17a–17c, respectively. Fluid inlets 16 receive fluid pressure from lines 15'a–15'c connected to a 4-way fluid connector 15d which receives hydraulic fluid pressure represented by arrow 15e.

Each ram detachably supports the outer end 18a of its associated lever 18. Lever 18 is radically movable from a non-clamping position (as shown by the solid lines in FIG. 2) to a clamping position (as shown by the dotted lines). In the clamping position, the lever's inner end 18b grips a portion of the inner side 5 of the bottom flange 4 supported by test plate 22. Since lever 18 is not connected to any other part of the testing apparatus 1, positioning and removing of lever 18 can be very quickly accomplished. The cross-sectional area of lever 18 will depend on the clamping pressures required, and this area must be such as to prevent the bending of lever 18 about bar 13.

Plate 22 has a fluid inlet 23 to which is threadedly connected a nipple 24 coupled to a fluid line 25 receiving hydrostatic high pressure represented by arrow 26. Inlet 23 is in alignment with the center of bore 3a in valve 2.

In the preferred embodiment, test plate 22 is provided with a cylindrical depression 30 which tightly receives a cylindrical plate insert 29. Insert 29 is preferably fabricated from stainless steel, while plate 22 and table 20 can be fabricated from less-expensive, ordinary steel. Insert 29 has a top surface in which are provided one or more concentric grooves 31a adapted to carry sealing rings, such as O-rings 31 made of hard rubber so as to withstand abrasion. The inter-spacings between grooves 31a are such that the outer side 6 of bottom flange 4 will rest on and span over two or more O-rings 31 so as to improve the fluid-tight connection between flange 4 and plate insert 29.

With this construction, it will be appreciated that different plate inserts 29, having different spacings between grooves 31a, can be easily provided to accommodate thereon different sizes of flanges 4.

Figure 5:
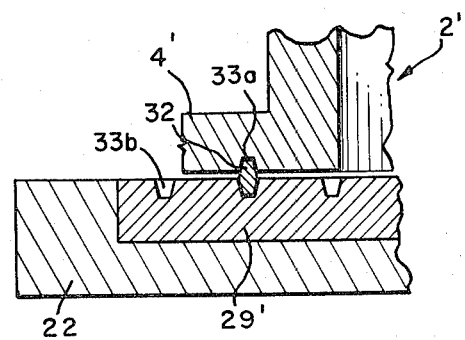
FIG. 5 is a fragmentary, sectional view of a modified plate insert for use with oil-type flanged valves.

The modified embodiment shown in FIG. 5 is especially adapted for hydrostatically testing oil production type valves 2' having flanges 4'. Each flange 4' has on the outer side 6 thereof a groove 33a for accepting a standard type steel ring seal 32 therein. In all other respects, the embodiment of FIG. 5 is identical to that described in connection with FIGS. 1–4. In this embodiment, there is provided in the test plate 22 an insert plate 29' having one or more concentric grooves 33b shaped to accept the ring seals 32.

In use of the embodiments shown in FIGS. 1–5, after valve 2 or 2' is positioned on the test plate 22 so that bottom flange 4 is concentric with fluid inlet 23, each lever 18 is then positioned between plates 12 of yoke 11 under fulcrum bar 13. If required, an insert 14 is disposed between lever 18 and fulcrum 13. Lever 18 is moved radially inwardly toward casing 3 to grip a portion of bottom flange 4.

Figure 2:
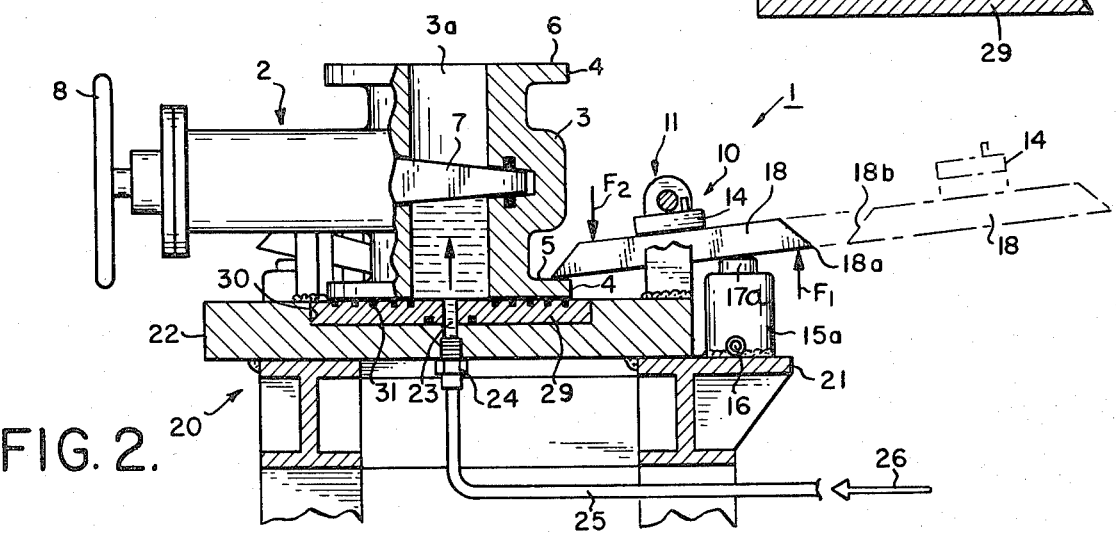
FIG. 2 is a side elevational view, partly in section, of the apparatus shown in FIG. 1.
Figure 4:
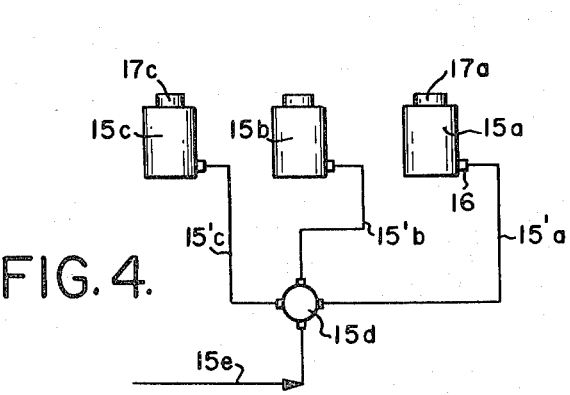
FIG. 4 is a schematic representation of the hydraulic circuit used in connection with the hydraulic cylinders shown in FIG. 1.

After valve 2 and lever 18 are set up, as shown in FIG. 2, hydraulic fluid pressure 15e is simultaneously applied by connector 15d to the inlets 16 of cylinders 15a–15c, thereby simultaneously causing their rams 17a–17c to produce equal, upward, vertical forces, represented by arrows $F_1$, against the outer ends 18a of levers 18. Forces $F_1$ are multiplied by the lever ratio of lever 18 to produce, equal, downward, vertical forces, represented by the arrows $F_2$, that are exerted by the inner ends 18b of levers 18 against the bottom flange 4. Utilizing at least three clamping units 10 will result in a stable clamping action and, therefore, in an effective fluid-tight connection between bottom flange 4 and plate insert 29. Clamping forces $F_2$ should be sufficiently large to firmly compress the underlying O-rings 31 or ring seals 32.

With the set up completed, hydrostatic fluid pressure 26 can now be applied through fluid inlet 23 into bore 3a of valve 2 whose closure member 7 is in its fully-closed position. Since the clamping forces $F_2$ are exerted only against the bottom flange 4, the results of the hydrostatic test can be visually inspected through the upper flange 4 without obstruction and while the test is in progress. Should the connection between plate 29 and bottom flange 4 not be sufficiently fluid-tight for the applied hydrostatic pressure 26, the hydraulic fluid pressure 15e can be increased which will produce still larger clamping forces $F_2$.

After the hydrostatic test is accomplished, the hydraulic fluid pressure 15e is gradually released, and the hydrostatic pressure 26 is removed. Valve 2 can now be removed from the test table 20, and the test fluid entrapped within bore 3a will leak out over plate 22.

In the alternate embodiment of the testing apparatus 1a shown in FIGS. 6 and 7, valve 2 is mounted on a test plate 22a which is welded, as at 43, to rams 42 of hydraulic cylinders 40a–40c. Each ram 42 has a piston 41 that is movable within bore 44 by fluid pressure 45. The yoke 11, bar 13, and lever 18 are as described in connection with the test apparatus 1 shown in FIGS. 1–5, except that yokes 11 are now supported by and welded to circumferentially-positioned, stationary supports 39a–39c. The outer ends of levers 18 are supported by and reacted against stationary reaction blocks 38a–38c fixedly secured to supports 39a–39c, respectively.

In use of the alternate apparatus 1a, the initial setup includes mounting valve 2 concentrically with inlet 23 on the test plate 22, as previously described, and positioning lever arms 18 so that their inner ends grip angularly-disposed portions of the underside 5 of the valve's bottom flange. After this initial setup, hydraulic fluid 45 is simultaneously applied to cylinders 40a–40c, thereby causing rams 42 to simultaneously produce equal, upward, vertical forces against the underside of test plate 22a. These forces will cause plate 22a to move upwardly until sufficient reaction pressures are developed between the inner ends of levers 18 and the bottom flange resting on plate 22a. The fluid pressure 45 should be sufficient to cause the underlying O-rings 31 to compress, thereby to provide the required fluid-tight joint. Valve 2 is tested as before with hydrostatic pressure 26 applied to inlet 23 through line 25.

While one hydraulic cylinder 40a can be employed to support test plate 22a, at least three such hydraulic cylinders 40a–40c are preferred because they provide a balanced support for movable plate 22a. This is especially desirable because valves 2 are typically unsymmetrically constructed.

It will now be appreciated that the embodiments 1, 1a of the testing apparatus of this invention are especially adapted for rapidly testing various sizes of flanged devices under relatively-large hydrostatic pressures. In known clamping fixtures utilizing flat gasket seals, the effective hydrostatic test pressure 26 was limited to about 70 bars, while with the O-rings 31 and the clamping units 10 of this invention, the hydrostatic test pressure can be increased by about 300% or to about 210 bars. Using the embodiment shown in FIG. 5, the test pressure can be increased 1500% or to about 1050 bars.

The completely detached or "free-floating" levers 18 enable very quick coupling and uncoupling of the test valves 2 to and from test plate 22. The balance application of the simultaneous and equal clamping forces $F_2$ against the bottom end flange 4 of test valve 2 resting on O-rings 31 allows the testing apparatus of this invention to be used even where vibrations might be experienced.

Since the number of moving parts in the testing apparatus 1 or 1a of this invention is reduced to a minimum, wear and tear on such parts is also at a minimum. Therefore, the testing apparatus 1 or 1a of this invention retains its useful effectiveness for a relatively long time and requires minimum maintenance.

Using the apparatus of the present invention, the testing speed can be increased considerably. It is estimated that one operator can easily operate the apparatus and test up to thirty valves per hour, as compared to testing a few (typically 2 or 3) valves per hour with known valve testing machines.

Also, the required time to make the apparatus ready for testing a valve has been reduced by more than 70%.

The provision of the plate inserts 29, 29' enables the very rapid testing of greatly different sizes of valves utilizing only a single valve testing apparatus.

What is claimed is:

1. An apparatus for testing a device having an annular flange, said apparatus including:
   a test plate for supporting said annular flange, said plate having a fluid inlet;
   at least one clamping unit comprising:
   (a) a lever disposed in a radial direction relative to said annular flange, said lever having an outer end detachably resting on an underlying support and an inner end adapted to grip a portion of said flange,
   (b) a fulcrum fixedly mounted above said lever intermediate the lever's inner and outer ends, said lever being adapted to pivot about said fulcrum, and
   (c) force-producing means exerting a controllable vertical force against one end of said lever.

2. An apparatus for testing a valve having a casing defining an inlet port, an outlet port, a flowway between the inlet and outlet ports, and a closure member for regulating the flow of fluid through the flowway, said apparatus comprising:
   a test plate defining a fluid pressure-receiving bore whereby, in use, said valve body is resting on said test plate with said inlet port being in fluid communication with said bore;
   a source of fluid pressure adapted to be coupled to said bore;
   clamping means coupled to a portion of said valve body between said closure member and said test plate for removably clamping said valve to said test plate, said clamping means producing a downward clamping pressure which becomes exerted only on said valve body portion, thereby leaving said outlet port unobstructed for visual inspection of the effectiveness of said closure member;
   said clamping means having at least one clamping unit including:
   (a) a rigid lever whose inner end is freely movable toward said portion of said valve body;
   (b) support means supporting the outer end of said lever;
   (c) a fulcrum about which said lever can pivot; and
   (d) force-producing means for exerting a vertical force against one end of said lever, thereby causing the inner end of said lever to exert a predetermined, downward clamping pressure on said body portion to provide a fluid-tight connection between said valve body portion and said test plate.

3. The apparatus according to claim 2, wherein said force-producing means is a fluid-operated ram and the outer end of said lever detachably rests on and is supported by said ram, whereby a controllable upward vertical movement of said ram produces said predetermined clamping pressure.

4. The apparatus according to claim 2, wherein said force-producing means is a fluid-operated ram and said test plate rests on and is supported by said ram for movement in a vertical direction, and said outer end of said lever detachably rests on and is supported by a fixed, immovable support, whereby the upward vertical movement of said ram produces said predetermined clamping pressure.

5. The apparatus according to claim 4, wherein said test plate has at least one annular groove, and a seal ring mounted in said groove.

6. The apparatus according to claim 4, wherein said valve casing has an annular flange and the outer side of said flange has at least one annular groove, said test plate has a mating annular groove, and a seal ring is disposed, in use, within said grooves.

7. A testing apparatus for testing a flanged device having a casing defining a chamber and at least one annular end flange, including:
   a test plate having a fluid inlet, said flange being disposed on said plate, a sealing element disposed on said plate underneath said flange, said inlet being in fluid communication with said chamber which is sealed off by said sealing element;
   at least one clamping unit comprising:
   (a) a lever disposed in a radial direction relative to the center of said annular flange, said lever having an outer end detachably resting on an underlying support, and an inner end gripping a portion of said flange,
   (b) a fulcrum fixedly mounted above said lever intermediate its inner and outer ends, said lever being adapted to pivot about said fulcrum, and
   (c) force-producing means exerting a controllable vertical force against one end of said lever, thereby causing the inner end of said lever to exert a predetermined, downward clamping pressure on said flange, said clamping pressure compressing said dealing element, whereby a fluid-tight connection is established between said flange and said plate to allow said chamber in said device to accept a high-pressure fluid through said fluid inlet in said plate for testing said device.

* * * * *